A. J. HODGE.
CORNER FASTENING FOR BOXES.
APPLICATION FILED JULY 2, 1908. RENEWED DEC. 19, 1910.
1,000,600.  Patented Aug. 15, 1911.
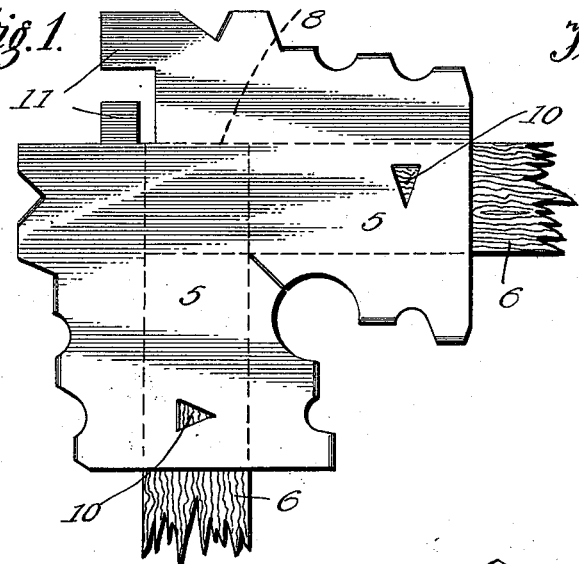
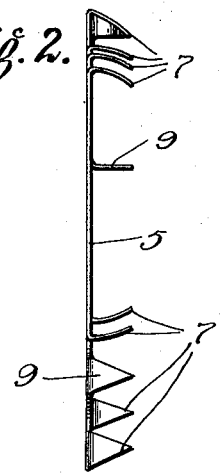
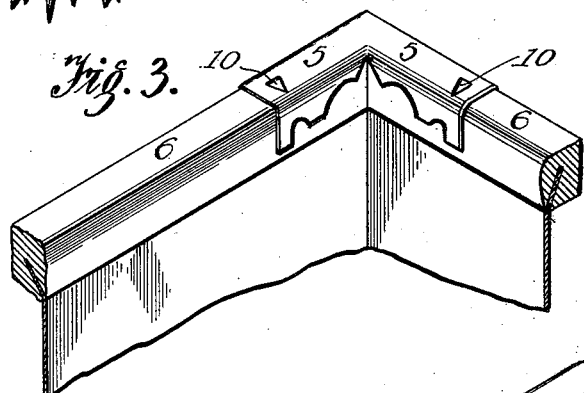
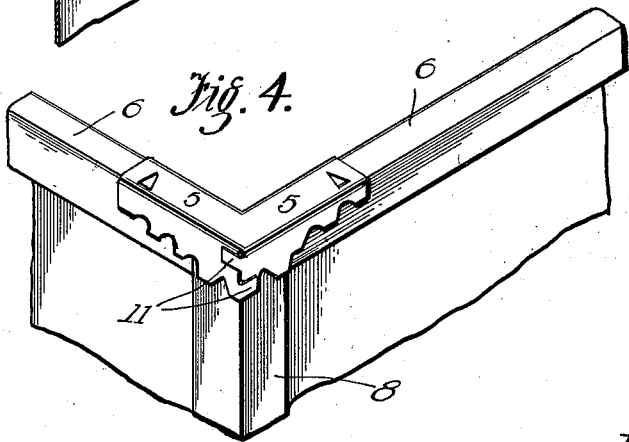
Witnesses.
Inventor
Arthur J. Hodge
By Harold Krause
Attorneys.

UNITED STATES PATENT OFFICE.

ARTHUR J. HODGE, OF PASADENA, CALIFORNIA, ASSIGNOR, BY MESNE ASSIGNMENTS, TO ILLINOIS RAWHIDE BOX CO., OF CHICAGO, ILLINOIS, A CORPORATION OF ILLINOIS.

CORNER-FASTENING FOR BOXES.

1,000,600.

Specification of Letters Patent. Patented Aug. 15, 1911.

Application filed July 2, 1908, Serial No. 441,579. Renewed December 19, 1910. Serial No. 598,165.

*To all whom it may concern:*

Be it known that I, ARTHUR J. HODGE, a citizen of the United States, residing at Pasadena, in the county of Los Angeles and State of California, have invented new and useful Improvements in Corner-Fastenings for Boxes, of which the following is a specification.

This invention relates to a corner fastening adapted for use upon boxes constructed with stiffening rails along the edges. As these rails provide the main strength of the box it is extremely desirable that they should be securely fastened together and the present fastening is designed to form a strong and durable connection between the three stiffening rails meeting at each corner.

In the accompanying drawings, forming a part of this specification:—Figure 1,— is a plan view of the fastening in its first stage of application to a box corner. Fig. 2,— is an edge view of the same. Fig. 3,— is a perspective view from the inside of the box showing the fastening applied. Fig. 4,— is a similar view from the outside of the box.

The fastening is preferably stamped from a sheet of metal, such as soft sheet steel, in the general configuration shown in Figs. 1 and 2. The body portion 5 is composed essentially of two elongated portions placed at an angle to each other and designed to cover the two horizontal rails 6; the lateral edges of these portions are irregularly shaped and provided with engaging teeth 7 which are driven into the molder rails 6 and 8 when the fastening is bent over the box corner as shown in Figs. 3 and 4. Teeth 9 are also stamped out of body 5, leaving apertures 10, these teeth being driven into the tops of rails 6 as indicated in Fig. 1. These teeth hold the fastener in place and prevent it from slipping while teeth 7 are being forced into the rails. At the outside corner of the fastening projections 11 are left which are bent around the outside corner of the rails as shown in Fig. 4.

From the foregoing description it is evident that a fastening has been provided which is simple and durable and easy of application. In boxes and crates of the general character described the stiffening rails are comparatively small so that the use of rails or screws to fasten them together would cause splitting of the wood and general weakness of the box. The present fastening has no such disadvantages as the teeth entering the wood are thin and are spaced so as to not follow the longitudinal grain of the wood as shown in Fig. 4.

Having described my invention, what I claim as new and desire to secure by Letters Patent is:—

1. A corner fastening for boxes and the like, comprising a single piece of sheet metal formed into a right angle and adapted for placement at the corner of a box, the edges of said angle being bent downwardly at right angles thereto, an attaching prong formed in the body of each leg of the angle, and means formed on the edges for attaching the angle to a box.

2. A corner fastening for boxes and the like, comprising a single piece of sheet metal formed into a right angle, and adapted for placement at the corner of a box, the edges of said angle being bent downwardly at right angles thereto, means formed on the edges for attaching the angle to the inner and outer faces of the box sides adjacent the corner thereof, and an attaching prong formed on each leg of the angle, said prongs adapted to maintain the angle in proper relation to the box corner before the edges of the angle are bent downwardly.

3. A corner fastening for boxes and the like, comprising a single piece of sheet metal formed into a right angle and adapted for placement at the corner of a box, the parallel edges of each leg of the angle being bent downwardly and at right angles thereto so as to embrace the inner and outer vertical faces of a box, and a plurality of attaching prongs formed on said edges and adapted to enter the vertical faces of the box.

In witness that I claim the foregoing I have hereunto subscribed my name this 19th day of June, 1908.

ARTHUR J. HODGE.

Witnesses:
JAS. H. GAUT,
JAMES T. BARKELEW.

Copies of this patent may be obtained for five cents each, by addressing the "Commissioner of Patents, Washington, D. C."